(12) United States Patent
Patel et al.

(10) Patent No.: US 10,652,539 B1
(45) Date of Patent: May 12, 2020

(54) IN-BAND SIGNALING FOR DISPLAY LUMINANCE CONTROL

(71) Applicant: Facebook Technologies, LLC, Menlo Park, CA (US)

(72) Inventors: Nirav Rajendra Patel, San Francisco, CA (US); Lyle David Bainbridge, Redwood City, CA (US); Sandro Pintz, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 227 days.

(21) Appl. No.: 15/665,217

(22) Filed: Jul. 31, 2017

(51) Int. Cl.
*H04N 19/124* (2014.01)
*H04N 19/182* (2014.01)

(52) U.S. Cl.
CPC ......... *H04N 19/124* (2014.11); *H04N 19/182* (2014.11); *H04N 2201/02435* (2013.01); *H04N 2201/3252* (2013.01)

(58) Field of Classification Search
CPC ............... H04N 19/124; H04N 19/182; H04N 2201/3252; H04N 2201/02435
USPC .................................................. 345/204, 690
See application file for complete search history.

(56) References Cited

U.S. PATENT DOCUMENTS

| | | | |
|---|---|---|---|
| 2011/0235715 A1* | 9/2011 | Chien | H04N 19/176 375/240.16 |
| 2012/0075353 A1* | 3/2012 | Dong | H04N 5/58 345/690 |
| 2017/0127062 A1* | 5/2017 | Zhao | H04N 19/124 |

* cited by examiner

*Primary Examiner* — Carolyn R Edwards
(74) *Attorney, Agent, or Firm* — Fenwick & West LLP

(57) ABSTRACT

A video coder is configured to encode video data, wherein one or more pixels of the encoded video data is used to signal in-band a luminance adjustment value for configuring an overall luminance of the displayed video data. In addition, the video data for pixels of the video data are scaled based upon the luminance adjustment value to compensate for the changed overall luminance. By signaling the luminance adjustment value in-band as part of the encoded video data, the need for a separate control channel is reduced, while also simplifying synchronization between the luminance adjustment value and the frame of video data to which it applies. The display may extract and parse the signaled luminance adjustment value to control a parameter of the display device (e.g., driving voltage, supply current, duty cycle, etc.) to achieve the overall luminance level indicated by the luminance adjustment value.

20 Claims, 5 Drawing Sheets

IN-BAND SIGNALING FOR DISPLAY LUMINANCE CONTROL

BACKGROUND

The present disclosure generally relates to luminance control for display devices, and specifically to luminance control using in-band signaling.

A video encoder may receive a frame of video or image data comprising luminance or intensity values for various pixels or sub-pixels of the frame, and encode the received frame for transmission or display by a display device. As part of the encoding process, the pixel or sub-pixel intensity values are quantized to discrete values within a limited range (e.g., integer values from 0 to 255). Because there are only a limited number of discrete values, some of the detail and contrast in the frame may be limited, especially for relatively dark scenes. It is thus desirable to be able to be able to increase an amount of detail that can be displayed in these darker scenes.

SUMMARY

A video coder codes frames of video data that include an input signal indicating a luminance adjustment value. The luminance adjustment value specifies an overall luminance of a display for displaying the coded video data. In addition, the video coder scales the luminance values of individual pixels based upon the luminance adjustment value, such that the luminance values of the pixels are able to map to a larger range of quantized luminance values, allowing for a larger number of discrete luminance levels to be displayed. Thus, for relatively dark frames of video data, the video coder sets a luminance adjustment value to reduce the overall luminance of the display, in order to provide power savings while also increase a level of detail that can be displayed. The luminance adjustment value is signaled in-band by replacing the video data for one or more pixels of the frame of image data, eliminating the need for a separate control channel or synchronization mechanisms for synchronizing the luminance adjustment value to its corresponding frame. The display, upon receiving the coded video data, extracts the luminance adjustment value signaled by the one or more pixels of the frame, and parses the luminance adjustment value to control a parameter of the display device (e.g., driving voltage, supply current, duty cycle, etc.) to achieve the overall luminance level indicated by the luminance adjustment value.

In accordance with some embodiments, a video coder is provided. The video coder comprises a video data analysis module that determines a luminance adjustment value for a received frame of video data, based upon video data values for a plurality of pixels of the frame of video data. The video coder further comprises a scaling module that scales the video data for each of at least a portion of the plurality of pixels of the frame of video data other than a first pixel, based upon the determined luminance adjustment value. The video coder further comprises an encoder that encodes the scaled frame of video data, and wherein the encoding comprises replacing the video data for the first pixel of the frame of video data with the luminance adjustment value. The video coder further comprises a transmitter to transmit the scaled frame of video data including the first pixel for display by a display device.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

System Overview

The techniques described herein may be applied to video or image data that may be displayed on any type of electronic display (e.g., a television, a computer monitor, a mobile phone screen, and/or the like). In some embodiments, the electronic display may correspond to a display implemented as part of a head-mounted device (HMD) used in a virtual reality (VR), augmented reality (AR), or mixed reality (MR) system.

Figure 1:
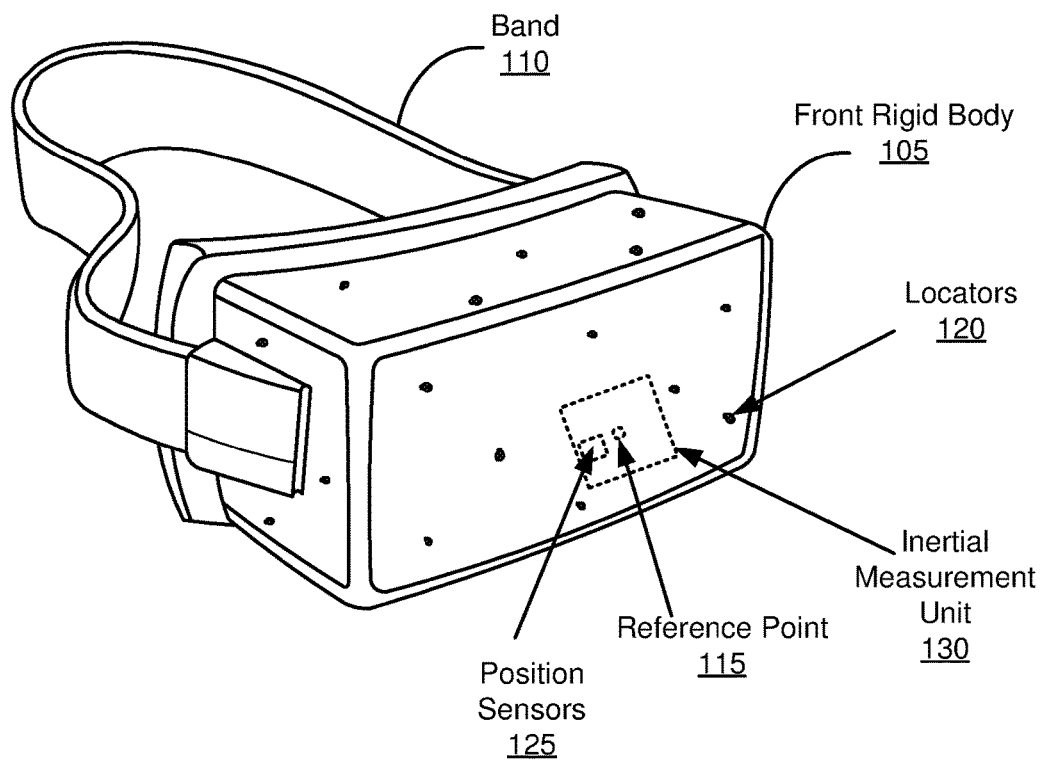
FIG. 1 is a diagram of a head mounted display (HMD), in accordance with an embodiment.

FIG. 1 is a diagram of an HMD 100, in accordance with an embodiment. The HMD 100 may be a part of, e.g., a VR system, an AR system, a MR system, or some combination thereof. The HMD 100 includes a front rigid body 105 and a band 110. In embodiments that describe AR system and/or a MR system, portions of a front side 120A of the HMD 100 are at least partially transparent in the visible band (~380 nm to 750 nm), and portions of the HMD 100 that are between the front side 120A of the HMD 100 and an eye of the user are at least partially transparent (e.g., a partially transparent electronic display).

The front rigid body 105 may include a combination of one or more electronic displays (not shown in FIG. 1), an inertial measurement unit (IMU) 130, one or more position sensors 125, and one or more locators 135. In the embodiment shown by FIG. 1, the position sensors 125 are located within the IMU 130, and neither the IMU 130 nor the position sensors 125 are visible to the user.

The locators 135 may be located in fixed positions on the front rigid body 105 relative to one another and relative to a reference point 115. In the example of FIG. 1, the reference point 115 is located at the center of the IMU 130. Each of the locators 135 may emit light that is detectable by an imaging device. In some embodiments, the locators 135 may comprise passive elements (e.g., a retroreflector) configured to reflect light from a light source that may be detectable by an imaging device. Locators 135, or portions of locators 135, are located on the front rigid body 105 in the example of FIG. 1. The imaging device may be configured to determine a position and/or an orientation of the HMD 100 based upon the detected locations of the locators 135, which may be used to determine the content to be displayed to the user via the electronic display. For example, where the HMD 100 is part of a VR system, the position and orientation of the HMD 100 may be used to determine which virtual objects positioned in different locations in a virtual world may be visible to the user of the HMD 100.

Figure 2:
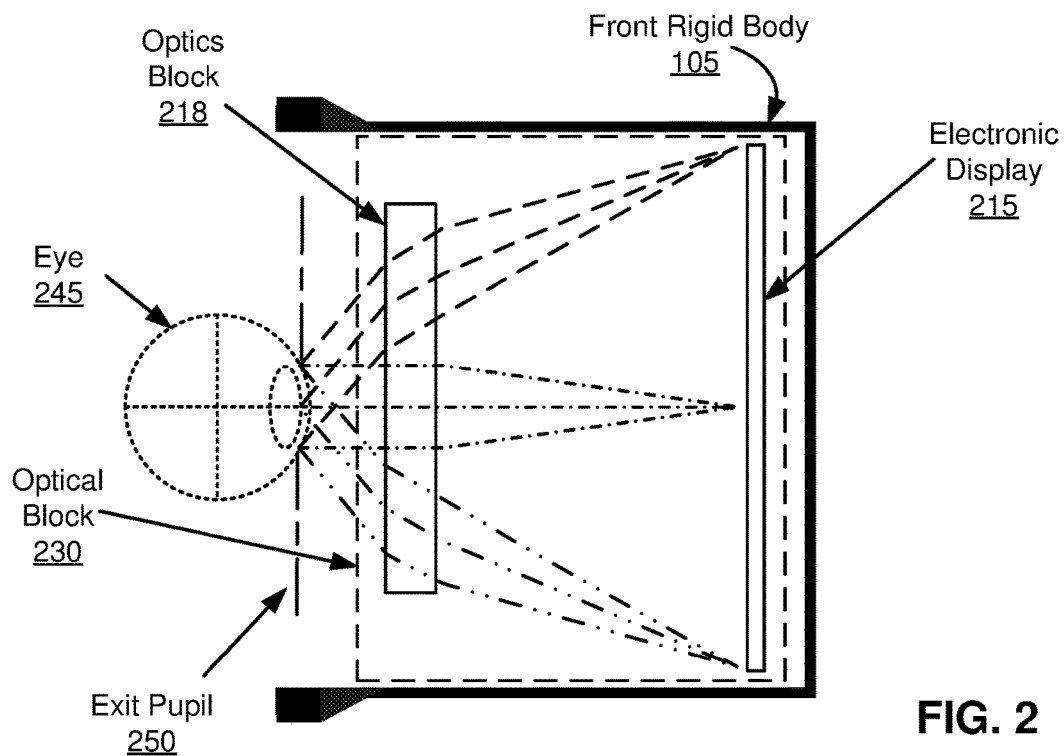
FIG. 2 is a cross section of a front rigid body of a HMD containing an eye tracking system, in accordance with an embodiment.

FIG. 2 is a cross section 225 of the front rigid body 105 of the embodiment of the HMD 100 shown in FIG. 1. As shown in FIG. 2, the front rigid body 105 includes a display subsystem 205 that provides altered image light to an exit pupil 250. The exit pupil 250 is the location of the front rigid body 105 where a user's eye 245 is positioned. For purposes of illustration, FIG. 2 shows the cross section 225 associated with a single eye 245. However, it is understood that in some embodiments, the display subsystem 205 may provide altered image light to both eyes of the user. In some embodiments, another display subsystem within the front rigid body 105, separate from the display subsystem 205, may provide altered image light to another eye of the user.

The display subsystem 205 includes an electronic display 215 and an optics block 218. The electronic display 215 emits image light toward the optics block 218. The optics block 218 may magnify the image light, and in some embodiments, also correct for one or more additional optical errors (e.g., distortion, astigmatism, etc.). The optics block 218 directs the image light to the exit pupil 250 for presentation to the user. The electronic display 215 may comprise an LCD display or other type of display having a backlight, or an OLED display or other type of display that does not utilize a backlight.

In-Band Signaling System

In some display systems, an overall luminance of the display may be adjusted when displaying different frames of video data, based upon the content of the frame to be displayed. As used herein, the term "overall luminance" may refer to a maximum luminance that can be achieved by a pixel or sub-pixel of a display. For example, in an LCD display that uses a backlight, a liquid crystal layer of the display modulates light emitted by the backlight of the display. As such, the overall luminance of the LCD display may be based upon a luminance level of the backlight, as the luminance level of the backlight defines a maximum achievable luminance of a pixel or sub-pixel of the display.

Luminance values of each pixel or sub-pixel in a frame of video data may be encoded using a binary number of a given bit-length, ranging from zero luminance to a maximum luminance level. As such, the coded luminance value of a pixel or sub-pixel may indicate a proportion of the overall luminance level of the display that the pixel or sub-pixel will be displayed at. In some embodiments, each pixel of a frame of video data may comprise a plurality of sub-pixels, each sub-pixel corresponding to a different color channel. In some embodiments, separate luminance values are coded for each sub-pixel of the pixel. As used herein, the term "pixels" may collectively refer to either pixels of a frame of video data or sub-pixels of the frame of video data.

Because the number of bits used to encode the luminance level of each pixel is limited to the given bit-length, only a limited number of discrete luminance levels can be displayed, potentially limiting the possible detail that can be displayed in the frame of video data. For example, where the given bit-length is 8, the luminance levels that can be achieved are limited to 256 discrete levels. However, when the frame of video data corresponds to a relatively dark image, the maximum luminance level of any pixel or sub-pixel within the frame may be low. As such, there may be a large difference between the maximum luminance level to be displayed in the frame and the overall luminance of the display (corresponding to the maximum achievable luminance level of the display), reducing the number of the discrete luminance levels that can be displayed.

By reducing an overall luminance of the display (i.e., the maximum luminance that the display is able to achieve), the range of luminance levels that the range of discrete luminance values map to is reduced, allowing for a greater amount of detail to be preserved. For example, where the maximum luminance level of any pixel in a relatively dark frame of video data corresponds to a discrete luminance level of 99 when there is no adjustment in the overall luminance level of the display, then only 100 discrete luminance levels can be displayed in the video frame (e.g., from 0 to 99). However, if the overall luminance of the display is reduced such that the maximum luminance that may be displayed is equivalent to a pre-adjustment luminance level of 99, then the luminance levels of the pixels of the video frame can be scaled and mapped to the full range of luminance values (from 0 to 255), resulting in a full 256 discrete levels of luminance that can be encoded. Accordingly, when displaying video data where there is no need to encode pixels with higher luminance values, the overall luminance of the display can be lowered to achieve finer detail, or less quantization, in the displayed video frame. In addition, by lowering an overall luminance of the display (e.g., by lowering a luminance of a backlight of the display) based upon the video data of the frame to be displayed, the display may be able to consume less power compared to if the overall luminance of the display is not adjusted.

Different types of displays for displaying video data (e.g., the electronic display 215 illustrated in FIG. 2) may be able to change the overall luminance of the display based upon a received luminance adjustment value. For example, for displays that comprise a backlight, such as in an LCD display, the overall luminance of the display may be lowered by lowering a luminance of the backlight. The luminance of the backlight may be lowered, for example, by lowering a voltage used to drive the backlight, lowering an amount of current supplied to the backlight, or changing a duty cycle of the backlight, based upon the received luminance adjustment value.

On the other hand, for displays that do not use a backlight, such as an OLED display, the overall luminance of the display may be lowered by adjusting a maximum luminance on a per-pixel basis. For example, the display device may adjust an amount of power supplied to each OLED of the display device corresponding to a pixel of the display, e.g., by adjusting a current level supplied to each OLED, a driving voltage for each OLED, a duty cycle of each OLED, and/or the like, in order to reduce an overall luminance level across the display by a uniform amount. For example, by lowering an amount of power (e.g., by adjusting a supply current, driving voltage, or duty cycle) supplied to an OLED of the display device, the maximum luminance that can be achieved by the OLED will be lowered. As such, a particular luminance value indicated in the coded video data will be displayed at a lower luminance compared to if the power supplied to the OLED was not adjusted.

The overall luminance of the display may be controlled based on a luminance adjustment value associated with a frame of video data. When coding a frame of video data to be displayed, a coder may determine a luminance adjustment value based upon the video data of the frame. For example, if the video data of the frame is relatively dark, it may be possible to reduce the overall luminance of the display, due to the lack of need to display any pixels with high luminance values. On the other hand, if the frame of video data contains pixels to be displayed with higher luminance, the overall luminance of the display may not be able to be lowered.

In addition, the coder scales the luminance values of the pixels of the video frame by a scaling factor based upon the luminance adjustment value, in order to take advantage of the full range of quantized luminance values. For example, if the luminance adjustment value is configured to reduce the overall luminance of the display by half, then the coder may double the coded luminance values of the pixels of video frame, preserving the overall appearance of the frame, while increasing an amount of luminance levels that can be displayed.

In some embodiments, the luminance adjustment value is provided to the display "in-band" as part of the video stream by replacing the data of one or more pixels of the frame. By signaling the luminance adjustment value in-band, the need for a separate communication channel is reduced, while also simplifying synchronization between the luminance adjustment value and the frame of video data to which it applies. For example, when the luminance adjustment value is provided in-band, there may be no need for a separate synchronization mechanism (e.g., separate timestamps associated with the video frame and with the luminance adjustment value) to synchronize luminance adjustment to its corresponding frame, such that the display is able to adjust its overall luminance for the correct frames of video data.

Figure 3:
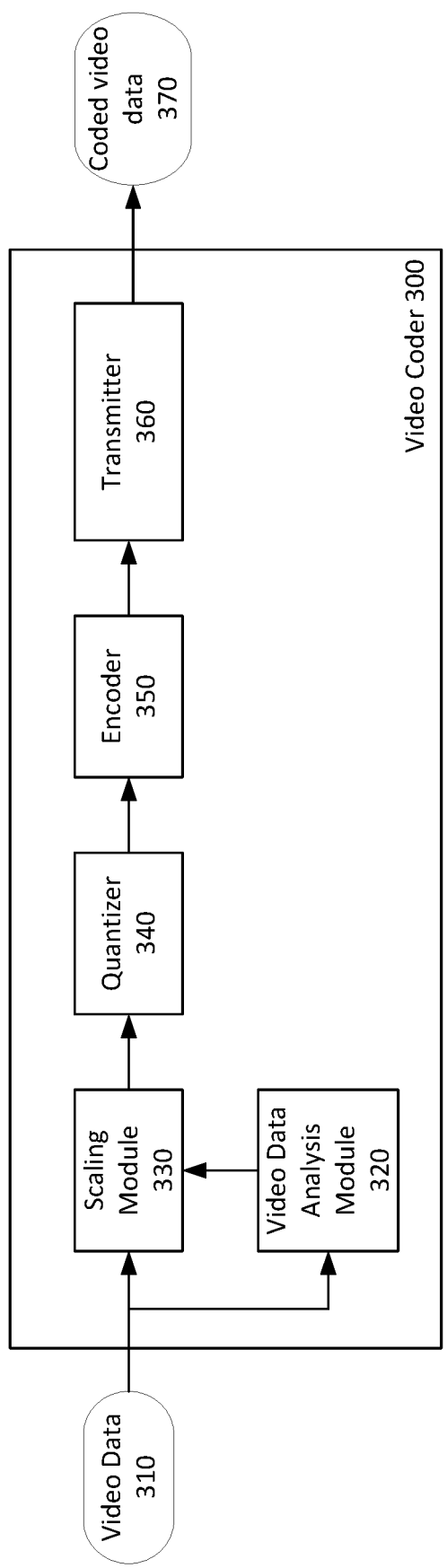
FIG. 3 is a block diagram of a system implementing in-band signaling for luminance control, in accordance with some embodiments.

FIG. 3 is a block diagram of a system implementing in-band signaling for luminance control, in accordance with some embodiments. The system comprises a video coder 300 that receives raw video data 310 from a host system (not shown), which may provide video data captured by an image capture device, such as a camera, and/or rendered video content. The video data 310 comprises a plurality of frames, each frame comprising captured video data for a plurality of pixels of the frame. The video data for a particular pixel may comprise luminance and chromatic information for the pixel, and/or the like.

The received video data 310 is analyzed by a video data analysis module 320 to determine a luminance adjustment value for frames of the received video data 310. In some embodiments, the luminance adjustment value corresponds to a value between 0 and 1, indicating a percentage the overall luminance of the video frame is to be reduced by the display.

A luminance adjustment value is determined for each frame or for a set of frames. In some embodiments, the luminance adjustment values for each frame or set of frames is determined independently of any previous frames or previously determined luminance adjustment values. In other embodiments, the video data analysis module 320 may restrict an amount that the luminance adjustment value for a particular frame or set of frames may differ in comparison to the luminance adjustment value of a previous frame or set of frames (e.g., by a set amount or percentage).

The video data analysis module 320 may calculate the luminance adjustment value for a frame based upon a statistical analysis of the luminance values of the pixels of the frame. For example, the video data analysis may generate a histogram or other data structure indicating luminance values of the pixels of the video frame. In some embodiments, the video data analysis module 320 determines if a threshold number of pixels of the video frame fall below a particular luminance value (hereinafter referred to as "upper range luminance value"). For example, the upper range luminance value for the video frame corresponding to a lowest luminance value that is greater than a threshold percentage of the pixels of the video frame. The threshold percentage may correspond, for example, to above 90% of the pixels of the frame, or any other desired threshold.

The video data analysis module 320 may determine a luminance adjustment value based upon the determined upper range luminance value. In some embodiments, the luminance adjustment value is based upon a ratio between the upper range luminance value and a maximum luminance value. For example, where the maximum luminance value corresponds to a quantized luminance value of 255, and the upper range luminance value corresponds to a quantized luminance value of 102, the luminance adjust value may be calculated as 102/255 or 40%.

In some embodiments, if the upper range luminance value is above a threshold value (e.g., above a certain percentage of the maximum luminance), then the video data analysis module 320 may set the luminance adjustment value such that overall luminance of the video frame will be unchanged. For example, the luminance adjustment value may be automatically set to 1, indicating no change in the overall luminance of the video frame.

In some embodiments, determining the luminance adjustment value for a frame may further be based upon other one or more additional attributes of the video data of the frame, such as an average luminance value of the video frame, or a standard deviation of the luminance values of the video frame. For example, in some embodiments, the threshold percentage for determining the upper range luminance value for a particular frame may be a function of the standard deviation of the luminance values of the frame.

The scaling module 330 scales the luminance values of the frame of the received video data 310 based upon a scaling parameter. The scaling parameter may be based upon the luminance adjustment value. In some embodiments, the scaling parameter corresponds to an inverse of the luminance adjustment value. For example, if the luminance adjustment value corresponds to 40%, then the scaling module 330 may scale the luminance values for each pixel of the frame by a factor of 2.5.

The scaled video data may then be quantized at the quantizer 340. In some embodiments, where the video data analysis module 320 determines that no luminance adjustment for the frame is needed (e.g., luminance adjustment value is equal to 1, or no luminance adjustment value is output), no scaling of the video data is performed by the scaling module 330, and the video data may be passed directly to the quantizer 340.

The video data of the frame is quantized by the quantizer 340 to span a particular range of discrete digital values (e.g., from 0 to 255). The range of quantized values may be selected based upon one or more settings of a display on which the video data is to be displayed, a bandwidth of a communication channel for transmitting the video data, a size of a frame buffer for storing frames of video data, a desired level of detail or precision for the video data, and/or the like. The range of quantized values represents a tradeoff between video quality and file size. For example, the larger the range of quantized values, the less information is lost to quantization, and more discrete gradations of luminance and chrominance can be displayed, at the expense of a larger amount of storage needed to store each frame of video data. While the present specification may primarily refer to the range of quantized values as being between 0 and 255, in other embodiments the range of quantized values may correspond to any numerical range.

Because the scaling parameter used by the scaling module 330 to scale the video data 310 is based upon the ratio between the determined upper range luminance value and a maximum luminance value (which when quantized corresponds to a maximum value of the discrete value range, e.g., 255), pixels of the frame having luminance values corresponding to the upper range luminance value prior to scaling are quantized to the maximum quantized value (e.g., 255). In some embodiments, pixels of the frame having luminance values above the upper range luminance value prior to scaling are compressed to the maximum quantized value (e.g., 255).

For example, where the maximum luminance value would correspond to a maximum quantized value of 255, if the upper range luminance value (pre-scaling) would correspond to a discrete quantized value of 102, then quantizing the image data of the frame without scaling would restrict the luminance values of the frame to quantized values up to 102. However, post-scaling, the video data of the frame may take advantage of the full range of discrete quantized luminance values (e.g., 0 to 255), at the expense of any pixels of the frame having luminance values above the upper range luminance value being compressed to the maximum quantized luminance of 255. This may decrease an amount of loss due to quantization, due to a larger ranger of quantized values being able to capture a larger number of luminance gradations in the video data.

In some embodiments, the quantized frame of video data may be stored in a frame buffer (not shown) before being encoded by an encoder 350. Because the video data of the frame has been quantized to a known range of values, the amount of storage space in the buffer needed to store each frame of video data is constant. In some embodiments, one or more frames of video data stored by the frame buffer may be used by the encoder 350 when encoding other frames of video data (e.g., for performing inter-predication).

In some embodiments, the scaling module 330, in response to receiving the luminance adjustment value from the video data analysis module 320, may also encode the luminance adjustment value into the quantized video data by replacing the quantized image data for one or more pixels of the frame (referred to as "signaling pixels") with the luminance adjustment value. For example, the scaling module 330 may code a particular pixel of the frame as a signaling pixel by replacing the video data corresponding to the pixel with the luminance adjustment value. In some embodiments, the signaling pixel may correspond to a pixel at a designated location within the frame (e.g., a pixel at the top left corner of the frame). In other embodiments, the signaling pixel is selected based upon one or more selection criteria. For example, the signaling pixel may correspond to a pixel of a plurality of candidate pixels in the frame having a lowest luminance value. In some embodiments, the signaling pixel may be coded after the video data of the frame has been quantized. For example, in some embodiments the encoder 350 receives the quantized frame of video data from the quantizer 340 and the luminance adjustment value from the video data analysis module 320, and codes the signaling pixel of the frame with the luminance adjustment value.

The encoder 350 encodes the quantized video data for transmission. In some embodiments, the encoder 350 codes the quantized video data (which may include one or more signaling pixels) based upon a video coding standard, such as MPEG, H.264, HEVC, and/or the like. For example, in some embodiments, the frame of video data is coded using one or more intra-prediction or inter-prediction techniques.

In some embodiments, each frame of video data will contain a signaling pixel storing a luminance adjustment value corresponding to the frame. In other embodiments, only certain frames of video data will contain a signaling pixel. For example, if the video data analysis module 320 determines a luminance adjustment value of 1 for a particular frame, the encoder 350 may not encode a signaling pixel for the frame.

In embodiments where not all frames of video data contain a signaling pixel, the encoder 350 may code a flag associated with the frame of video data, indicating that the frame of video data contains a signaling pixel. In some embodiments, the flag may also indicate a location of the signaling pixel within the frame. Alternatively, the signaling pixel may contain a flag indicating that it is a signaling pixel.

The encoded video data from the encoder 350 may be transmitted by a transmitter 360 as part of a coded video data bitstream 370 to a receiver (not shown). The coded video data bitstream 370 may be transmitted over any type of channel suitable for transmitting video data, such as a wired channel (an HDMI cable, MHL cablee, and/or the like), a wireless channel, and/or the like.

The receiver may comprise a decoder and a display device. The decoder may receive and decode the coded video data bitstream 370 to obtain quantized video data for each frame of video data. In some embodiments, the decoder may identify one or more signaling pixels in each frame (e.g., based upon a flag included in the video data, based upon a predetermined pixel in each frame, and/or the like) and extract a luminance adjustment value corresponding to the frame. The luminance adjustment value may be used by the display device to adjust an overall luminance for displaying the frame of video data. For example, the display device may parse the received luminance adjustment value to determine one or more backlight driving parameters or OLED parameters (e.g., supply voltage, driving current, duty cycle) for driving the display to achieve the overall luminance level indicated by the luminance adjustment value.

Figure 4:
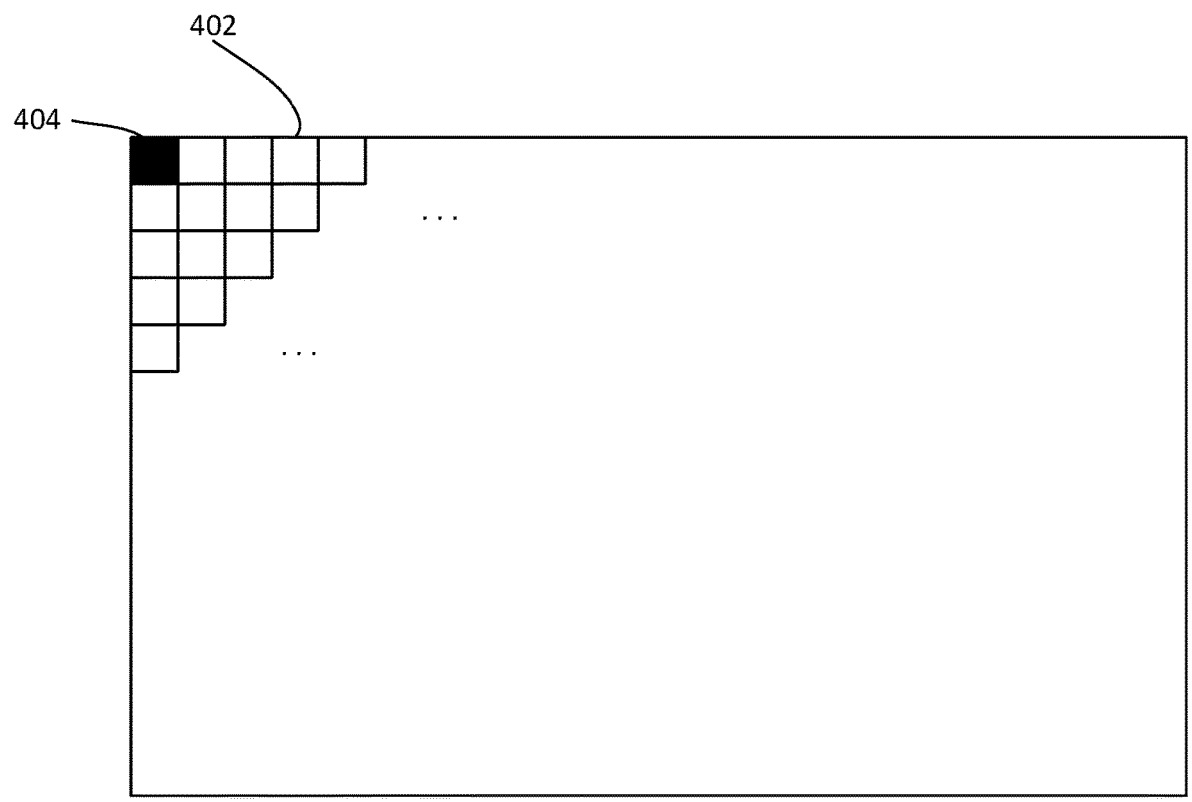
FIG. 4 illustrates a diagram of a frame of video data, wherein in-band signaling is used for luminance control, in accordance with some embodiments.

FIG. 4 illustrates a diagram of a frame of video data, wherein in-band signaling is used for luminance control, in accordance with some embodiments. The video frame 400 comprises a plurality of pixels 402. Each pixel 402 of the video frame 400 is associated with video data (e.g., luminance and chrominance values). In some embodiments, each pixel 402 corresponds to a plurality of sub-pixels, each sub-pixel corresponding to a different color channel (e.g., RGB color channels).

In some embodiments, the frame 400 comprises one or more signaling pixels 404 used for in-band signaling. For example, as illustrated in FIG. 4, the signaling pixel 404 corresponds to a pixel at a top left of the frame 400. Instead of comprising video data, the signaling pixel 404 instead signals a luminance adjustment value for the frame 400. In addition, it is understood that although FIG. 4 illustrates the frame 400 as having only one signaling pixel 404, in some embodiments the frame 400 may contain more than one signaling pixel 404. In some embodiments, if the frame 400 contains more than one signaling pixel 404, the different signaling pixels 404 may be located adjacent to each other in the frame 400, or may be located at different locations within the frame 400. In some embodiments, the number of signaling pixels 404 in the frame 400 may be based upon a number of bits needed to signal a luminance adjustment value and/or other data to be transmitted in-band as part of the frame 400. In some embodiments, the signaling pixel

404, instead of corresponding to an entire pixel, may instead correspond to a portion of a particular pixel (e.g., a sub-pixel of a particular pixel).

In some embodiments, because the signaling pixel 404 of the frame 400 does not contain video data (e.g., due to the video data being replaced with the luminance adjustment value), the signaling pixel 404 is displayed using a predetermined color and luminance. For example, in some embodiments, the signaling pixel 404 may be preconfigured to be displayed as black on the displayed frame 400. In other embodiments, the signaling pixel 404 may be displayed based upon the color and luminance of one or more nearby pixels of the frame 400. For example, the signaling pixel 404 may be displayed using a color and luminance of a neighboring pixel. In some embodiments, the signaling pixel 404 is displayed using a color and luminance based upon an aggregation of the color and/or luminance values of two or more other pixels of the frame 400 (e.g., a color and luminance corresponding to an average color/luminance of two or more other pixels).

In some embodiments, the signaling pixel 404 is a predetermined pixel in the frame 400. For example, the signaling pixel 404 may always correspond to a top left pixel of the frame 400. The signaling pixel 404 may correspond to a pixel near a periphery of the frame 400, in order to reduce an impact of the signaling pixel 404 on the visual appearance of the displayed frame 400.

In some embodiments, the location of the signaling pixel 404 is determined dynamically for the frame 400, based upon the video data associated with the pixels of the frame 400. For example, the signaling pixel 404 may be selected from a plurality of candidate pixels within the frame 400, based upon the video data associated with each of the candidate pixels (e.g., the signaling pixel 404 is selected as the candidate pixel having a lowest luminance value). In some embodiments, where the location of the signaling pixel 404 in the frame 400 is determined dynamically, the flag indicating that the frame 400 contains a signaling pixel 404 may also indicate the location of the signaling pixel within the frame 400. In some embodiments, the signaling pixel 404 may contain, in addition to the luminance adjustment value, a flag indicating that it is a signaling pixel.

By signaling the luminance adjustment value in-band using one or more signaling pixels of the video frame, the luminance of the video frame by the display can be adjusted without the need of a separate control channel. In addition, because the luminance adjustment value is included as part of the data for the video frame, synchronization between the luminance adjustment value and the video frame to which the luminance adjustment value applies is easy to maintain.

Video Data Scaling

In some embodiments, because the luminance adjustment value of a video frame causes an overall luminance level of the displayed video frame to be reduced, the video data of the video frame may be scaled based upon the luminance adjustment value, in order to preserve the overall luminance perception of the video frame. In addition, by scaling the video data, a larger range of quantized values may be utilized, potentially improving a level of detail and contrast in the displayed video frame. Scaling of the video data may be performed by the scaling module 330 as describe above. In some embodiments, scaling the video data of the frame comprise scaling the luminance values of each pixel of the frame.

Figure 5A:
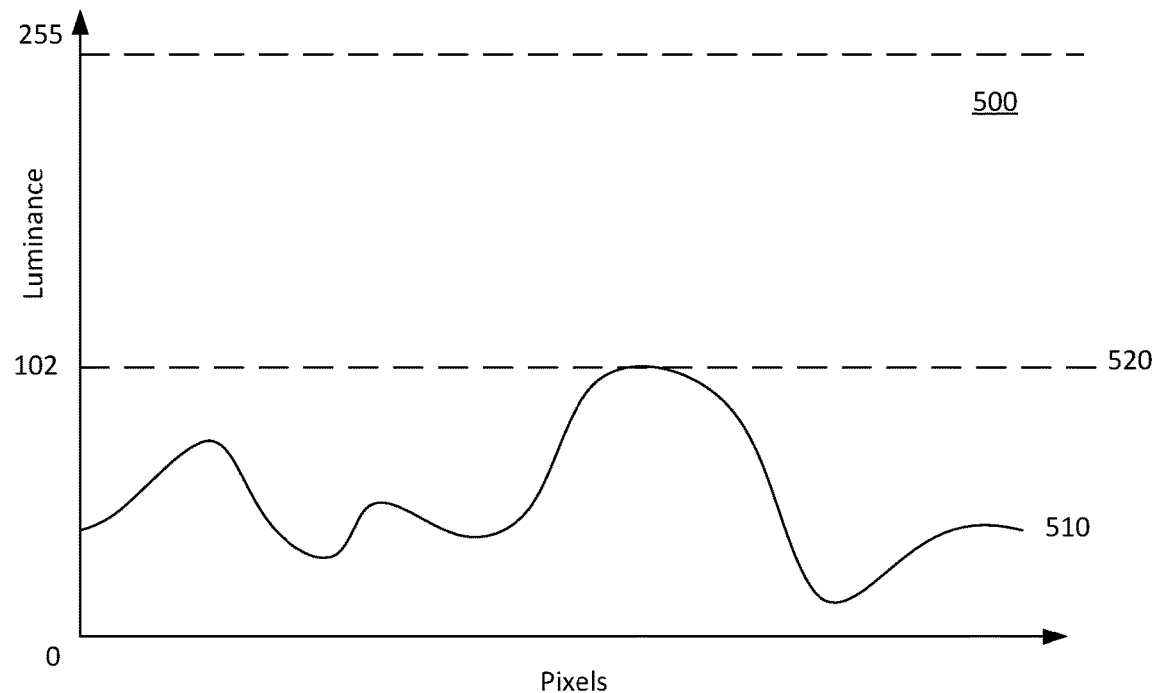
FIG. 5A illustrates a graph indicating quantized luminance levels of the pixels in a particular frame of video data without scaling, in accordance with some embodiments.
Figure 5B:
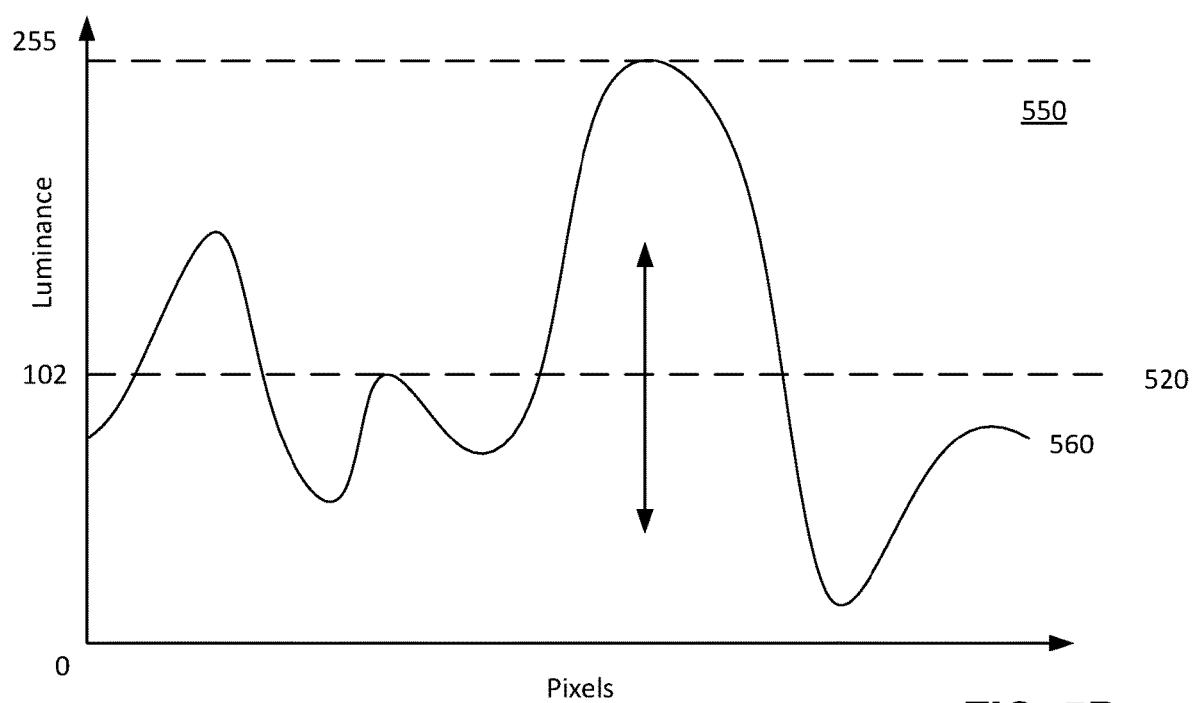
FIG. 5B illustrates a graph indicating quantized luminance levels of the pixels of the particular frame with scaling, in accordance with some embodiments.

FIGS. 5A and 5B illustrate example graphs showing the scaling of video data in a video frame, in accordance with some embodiments. FIG. 5A illustrates a first graph 500 indicating quantized luminance values of the pixels in a particular frame of video data without scaling, while FIG. 5B illustrates a second graph 550 indicating quantized luminance values of the pixels of the particular frame with scaling.

Graphs 500 and 550 each have an x-axis corresponding to the pixels of a particular frame of video data, and a y-axis corresponding to quantized luminance values. The quantized luminance values illustrated on the y-axis of the graphs 500 and 550 span a particular range (e.g., from 0 to 255). It is understood that in other embodiments, the luminance values of the video data may be quantized over other ranges (e.g., based upon a desired size of the video data, display quality of the video data, and/or the like).

The curve 510 of the first graph 500 illustrates the luminance values of the pixels of the frame of video data without scaling. As can be seen in FIG. 5A, the quantized pixel luminance values of the frame almost all fall under a first level 520, corresponding to a quantized luminance level of 102. As such, the quantized luminance values of the frame of video data are restricted to 103 possible quantized luminance values.

On the other hand, graph 550 illustrated in FIG. 5B illustrates a curve 560 indicating quantized luminance values for the frame of video data with scaling. In some embodiments, the luminance values of the frame are scaled based upon a scaling parameter based upon a ratio between the maximum quantized luminance level (e.g., 255) and the first level 520 (e.g., 102). As such, the luminance values of the frame of video data are quantized over a larger range of possible values (e.g., 256 possible values). In some embodiments, pixels of the frame having luminance values above the first level 520 prior to scaling (e.g., luminance values corresponding to quantized values above 102), are scaled to the maximum luminance value corresponding to the quantized luminance value of 255.

The scaling parameter may be based upon the luminance adjustment value. For example, while the luminance adjustment value is used to decrease an overall luminance of the video frame, the scaling parameter is used to increase the luminance of the pixels of the video frame. In some embodiments, the changes in luminance caused by the luminance adjustment value and the scaling parameter are balanced such that the perceived luminance of the displayed video frame is substantially unchanged.

As illustrated by the curve 560 in FIG. 5B, the quantized luminance values of the pixels of the video frame after scaling span a larger range of quantized luminance values. For example, the luminance values of the pixels of the video frame may be scaled to span substantially all of the full range of possible quantized luminance values (e.g., from 0 to 255). Due to the increased number of possible quantized values, the video frame may be able to be displayed with a greater level of detail with a larger number of possible luminance gradations.

Process Flow

Figure 6:
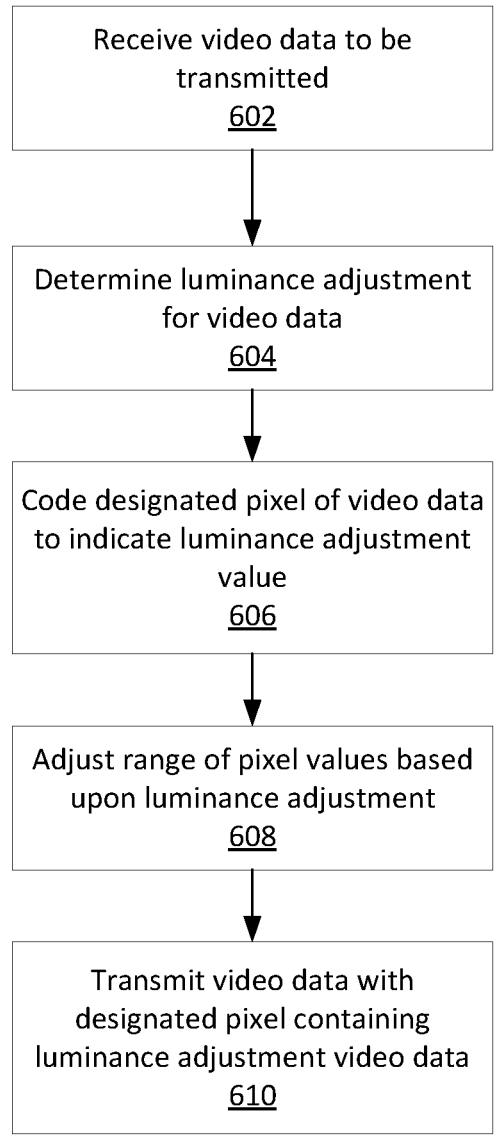
FIG. 6 illustrates a flowchart of a process for performing in-band signaling of luminance information, in accordance with some embodiments.

FIG. 6 illustrates a flowchart of a process for performing in-band signaling of luminance information, in accordance with some embodiments. At block 602, a video coder receives video data to be transmitted. The video data may be received from an image capture device such as a camera, and comprises a plurality of frames. Each frame is divided into a plurality of pixels, each pixel associated with video data (e.g., luminance and chrominance data).

At block 604, the coder determines a luminance adjustment value for a frame of the video data. In some embodiments, the coder determines a luminance adjustment value for each frame of the video data, or for sets of one or more frames of video data. In some embodiments, the luminance adjustment value for each frame (or set of frames) is determined independently from the luminance adjustment values of other frames (or sets of frames) in the video data. The luminance adjustment value may correspond to a value between 0 and 1, indicating a percentage that an overall luminance of the frame is to be adjusted.

In some embodiments, the coder determines the luminance adjustment value for a particular frame based upon the luminance data of the pixels for the particular frame. For example, the coder may determine an upper range luminance value corresponding to a luminance value that is greater than the luminance values of a threshold number of pixels in the frame. In some embodiments, the threshold number of pixels may be a predetermined value, or may be based upon an average luminance value or a standard deviation in luminance values of the pixels of the frame. In some embodiments, the luminance adjustment value is calculated as a ratio between the upper range luminance value and a maximum luminance value. In some embodiments, if the ratio between the upper range luminance value and a maximum luminance value is above a threshold amount, the coder may determine that the overall luminance for the frame should not be adjusted (e.g., set a luminance adjustment value of 1).

At block 606, the coder codes a particular pixel of the frame to indicate the determined luminance adjustment value. In some embodiments, the coder designates one or more pixels of the frame as signaling pixels, and replaces the video data of the pixels with the determined luminance adjustment value. In some embodiments, the signaling pixels may correspond to pixels at predetermined locations on the image frame. In other embodiments, the coder dynamically selects particular pixels of the frame for use as signaling pixels, based on one or more selection criteria.

In some embodiments, if the coder determines that the overall luminance for the frame should not be adjusted (e.g., luminance adjustment value equal to 1), then the coder does not code any pixel of the frame of video data to indicate the luminance adjustment value. In some embodiments, the coder codes a flag corresponding to the frame of video data, wherein the flag indicates whether or not the frame contains a signaling pixel containing a luminance adjustment value. In some embodiments, the flag may further indicate a location of the signaling pixel (if one exists for the frame).

At block 608, the coder adjusts the range of luminance values of the frame based upon the luminance adjustment value. For example, the coder may scale the luminance values of each non-signaling pixel of the frame by a scaling parameter determined from the luminance adjustment value. The scaling parameter may correspond to an inverse of the luminance adjustment value.

In addition, the coder may quantize the video data of the non-signaling pixels of the frame (which include the adjusted luminance values). In some embodiments, the video data of the frame is quantized to a range of discrete values (e.g., between 0 and 255). Because the luminance information of the frame has been scaled, the range of quantized luminance values may be increased in comparison to if no scaling was performed.

In some embodiments, the coder may further code the quantized frame of video data based upon a video coding standard, in order to prepare the video data for transmission and display.

At block 610, the coder transmits the coded video data having adjusted luminance value data, and the signaling pixel containing luminance adjustment value, to be displayed on a display device. In some embodiments, the video data is received by a decoder that decodes the video data and extracts the luminance adjustment value for the frame from the signaling pixel. The luminance adjustment value is used by the display device to adjust an overall luminance level of the display. For example, in embodiments where the display device comprises a backlight (e.g., an LCD display), the display device may adjust a luminance level of the backlight (e.g., by lowering an amount of current supplied to the backlight, lowering a driving voltage to the backlight, or changing the duty cycle of the backlight). In some embodiments where the display device does not utilize a backlight (e.g., an OLED display), the display device may adjust a current, driving voltage, or duty cycle of individual pixels in order to reduce an overall luminance level of the display. In some embodiments, because the luminance levels of the pixels have been scaled based upon the luminance adjustment value, the overall visual presentation of the frame is preserved. In some embodiments, the signaling pixel is displayed using a predetermined value (e.g., black), or using a value based upon the video data for one or more nearby pixels in the frame.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A video coder comprising:
a video data analysis module configured to receive a frame of video data, and to analyze luminance values of a plurality of pixels of the received frame to determine a luminance adjustment value for the frame indicating an amount of adjustment to an overall luminance level for the frame of video data;
a scaling module configured to scale the video data for each of at least a portion of the plurality of pixels of the frame of video data other than a first pixel, such that luminance values associated with each of the scaled pixels are adjusted in accordance with the determined luminance adjustment value;
an encoder configured to encode the scaled frame of video data, and wherein the encoding comprises replacing the video data for the first pixel of the frame of video data with the luminance adjustment value; and
a transmitter configured to transmit the scaled frame of video data as part of a bitstream for display by a display device, the scaled frame of video data including the first pixel having the luminance adjustment value instead of video data.

2. The video coder of claim 1, further comprising a quantizer configured to quantize the scaled image information of the frame of video data to discrete values within a designated precision range.

3. The video coder of claim 1, wherein the display device is configured to adjust a luminance level of a backlight based upon the luminance adjustment value indicated in the first pixel of the frame.

4. The video coder of claim 3, wherein the display device is configured to scale the luminance level of the backlight based upon the luminance adjustment value by adjusting at least one of a current used to drive the backlight, a current supplied to the backlight, or a duty cycle associated with the backlight.

5. The video coder of claim 1, wherein the display device comprises a display, and is configured to scale a luminance level of each pixel of the display based upon the luminance adjustment value indicated in the first pixel of the frame, by adjusting at least one of a voltage associated with each pixel, a current supplied to each pixel, or a duty cycle associated with each pixel.

6. The video coder of claim 1, wherein the display device is configured to display the first pixel of the frame of the video data using a predetermined value.

7. The video coder of claim 1, wherein the display device is configured to display the first pixel of the frame of video data based upon video data for one or more remaining pixels of the frame.

8. The video coder of claim 1, wherein the luminance adjustment value is determined based upon a statistical analysis of the luminance values of at the plurality of pixels of the frame.

9. The video coder of claim 8, wherein the luminance adjustment value is based upon an upper luminance level corresponding to a luminance level greater than that of at least a threshold number of pixels of the frame.

10. The video coder of claim 1, wherein the video data analysis module is configured to determine the luminance adjustment value for the received frame independently from other received frames of video data.

11. The video coder of claim 1, wherein the portion of the plurality of pixels are scaled based upon an inverse of the luminance adjustment value.

12. A computer-implemented method comprising:
receiving a frame of video data, the frame of video data comprising video data for each of a plurality of pixels;
analyzing luminance values of the plurality of pixels of the received frame to determine a luminance adjustment value for the frame indicating an amount of adjustment to an overall luminance level for the frame of video data;
replacing the video data for a first pixel of the frame of video data with the determined luminance adjustment value;
scaling the video data for each of at least a portion of the plurality of pixels of the frame of video data other than the first pixel, such that luminance values associated with each of the scaled pixels are adjusted in accordance with the determined luminance adjustment value; and
transmitting the scaled frame of video as part of a bitstream for display by a display device, the scaled frame of video data including the first pixel having the luminance adjustment value instead of video data.

13. The method of claim 12, further comprising quantizing the scaled image information of the frame of video data to discrete values within a designated precision range.

14. The method of claim 12, wherein the display device is configured to adjust a luminance level of a backlight based upon the luminance adjustment value indicated in the first pixel of the frame.

15. The method of claim 14, wherein the display device is configured to scale the luminance level of the backlight based upon the luminance adjustment value by adjusting at least one of a current used to drive the backlight, a current supplied to the backlight, or a duty cycle associated with the backlight.

16. The method of claim 12, wherein the display device comprises a display, and is configured to scale a luminance level of each pixel of the display based upon the luminance adjustment value indicated in the first pixel of the frame, by adjusting at least one of a voltage associated with each pixel, a current supplied to each pixel, or a duty cycle associated with each pixel.

17. The method of claim 12, wherein the display device is configured to display the first pixel of the frame of the video data using a predetermined value.

18. The method of claim 12, wherein the display device is configured to display the first pixel of the frame of video data based upon video data for one or more remaining pixels of the frame.

19. The method of claim 12, wherein the luminance adjustment value is based upon an upper luminance level corresponding to a luminance level greater than that of at least a threshold number of pixels of the frame.

20. The method of claim 12, wherein the portion of the plurality of pixels are scaled based upon an inverse of the luminance adjustment value.

* * * * *